United States Patent [19]

Blomgren et al.

[11] Patent Number: 4,492,403

[45] Date of Patent: Jan. 8, 1985

[54] METHOD AND APPARATUS FOR SECURING A WHEELCHAIR TO A VEHICLE FLOOR

[76] Inventors: Kenneth E. Blomgren, P.O. Box 33, Spicer, Minn. 56288; Louis B. Oberhauser, 2425 Dunwoody Ave., Wayzata, Minn. 55391

[21] Appl. No.: 394,450

[22] Filed: Jul. 1, 1982

[51] Int. Cl.³ .......................... B60N 1/02; B60P 3/06; B60P 7/08; B62B 11/00

[52] U.S. Cl. .......................... 296/65 R; 280/242 WC; 296/65 A; 297/468; 410/10; 410/20; 410/21; 410/30; 410/51

[58] Field of Search ................ 297/468; 280/242 WC, 280/801, 802; 410/9, 10, 11, 12, 19, 20, 21, 22, 23, 26, 30, 51; 296/65 R, 65 A

[56] References Cited

U.S. PATENT DOCUMENTS

| | | | |
|---|---|---|---|
| 1,279,397 | 9/1918 | Michod | 410/20 |
| 1,669,578 | 5/1928 | Scherer | 410/20 |
| 1,708,231 | 4/1929 | Moore et al. | 410/9 |
| 1,860,565 | 5/1932 | Berger et al. | 410/9 |
| 2,020,270 | 11/1935 | Wilson et al. | 410/9 |
| 2,026,512 | 12/1935 | Tobin | 410/10 X |
| 2,028,574 | 1/1936 | Tobin et al. | 410/10 |
| 3,955,847 | 5/1976 | Schiowitz | 296/65 R |
| 4,019,752 | 4/1977 | Leon et al. | 410/20 X |
| 4,060,271 | 11/1977 | Williams | 296/65 R |
| 4,083,594 | 4/1978 | Tullock | 410/9 X |
| 4,093,303 | 6/1978 | Nelson | 296/65 R |
| 4,103,934 | 8/1978 | Arnholt et al. | 410/23 X |
| 4,113,270 | 9/1978 | Barecki | 410/20 X |
| 4,257,644 | 3/1981 | Stephens | 410/12 |
| 4,265,478 | 5/1981 | Koregaard | 296/65 R |
| 4,266,822 | 5/1981 | Barecki et al. | 296/65 R |
| 4,273,498 | 6/1981 | Dickhart et al. | 410/51 X |

FOREIGN PATENT DOCUMENTS

| | | | |
|---|---|---|---|
| 2845870 | 5/1980 | Fed. Rep. of Germany | 410/51 |
| 3002133 | 7/1981 | Fed. Rep. of Germany | 280/242 WC |
| 2395878 | 1/1983 | France | 410/20 |
| WO79/00130 | 3/1979 | PCT Int'l Appl. | 410/10 |

*Primary Examiner*—Robert B. Reeves
*Assistant Examiner*—Howard Beltran
*Attorney, Agent, or Firm*—Schroeder Siegfried Vidas & Arrett

[57] ABSTRACT

A method and apparatus for securing a wheelchair and its occupant to the interior of a vehicle is disclosed, in which a pair of elongated flexible tensioning straps are secured at one end to the floor of the vehicle behind the wheelchair, a hood member carried by the intermediate portion of each is placed over the upper peripheries of each of the large wheels of the wheelchair and the opposite end portion slidably extends through a keeper secured to the floor ahead of the wheelchair and thence upwardly where its terminal portion is secured to the wheelchair frame. A section of a restraining belt is carried by intermediate portions of each of the tensioning straps, the sections connecting transversely between the straps to cooperatively restrain the occupant in the wheelchair.

16 Claims, 5 Drawing Figures

METHOD AND APPARATUS FOR SECURING A WHEELCHAIR TO A VEHICLE FLOOR

BACKGROUND OF PRIOR ART

Various devices for securing a wheelchair to a vehicle have been provided heretofore, but none of them have proved adequate for the intended purpose. All are either bulky, expensive, difficult to use or inadequately secure the chair and its occupant against movement, either sideways or about the axis of the chair's large wheels. Our invention is quick, simple, inexpensive, easy to use and secures both the wheelchair and its occupant against unwanted movement in all directions.

BRIEF SUMMARY OF THE INVENTION

Our invention provides a pair of elongated tensioning straps, each anchored to the floor of the transporting vehicle directly behind one of the large wheels of the wheelchair to be transported. The intermediate portion of each carries a hood member designed to drop over the upper periphery of one of the large wheels of the chair. Its opposite end portion extends downwardly from the hood and slidably extends through a keeper secured to the floor directly ahead of the wheel. From thence, it extends upwardly and is positively secured to the frame of the wheelchair. At a point between the end of the strap anchored to the vehicle and the end of the strap secured to the wheelchair there is a tensioning device to place the strap under tension. A section of a restraining belt is carried by each strap adjacent its hood member and cooperatively straps the occupant within the chair.

BRIEF DESCRIPTION OF THE DRAWINGS

A detailed description of the preferred embodiment of the METHOD AND APPARATUS FOR SECURING A WHEELCHAIR TO VEHICLE FLOOR is hereafter described with specific reference being made to the drawings in which.

DETAILED DESCRIPTION OF THE INVENTION

Figure 1:
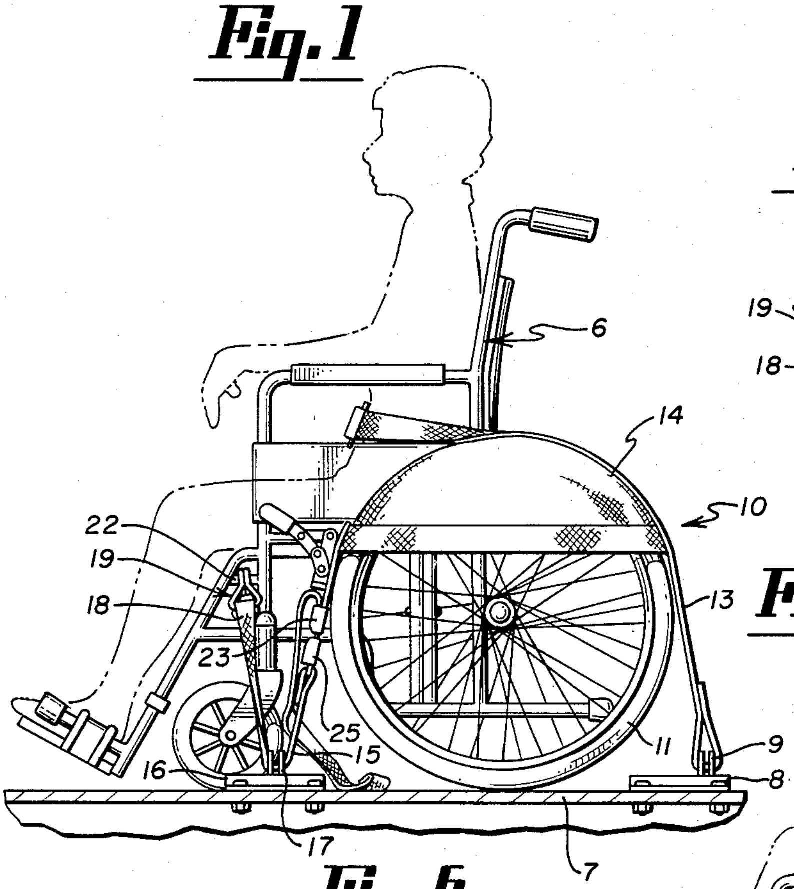
FIG. 1 is a left side elevational view of a wheelchair secured to the floor of a vehicle by our apparatus for accomplishing same.

The preferred embodiment of our invention as shown in FIGS. 1–5, inclusive, is designed to provide effective apparatus for firmly securing a wheelchair 6 and its occupant to the floor 7 of a transport vehicle to preclude movement relative thereto while in transport. It includes a pair of anchor brackets, such as indicated by the numeral 8, each having upstanding loop members 9 through which the end of a tension device 10 extends and to which the latter is secured in a suitable manner as by sewing or riveting, as shown. These anchor brackets 8 are spaced a distance equal to the axial spacing of the large wheels 11, 12 of the wheelchair and extend parallel to each other so that the tensioning device 10, when extended forwardly will overlie the upper periphery of the large wheel 11 or 12, as the case may be.

Figure 2:
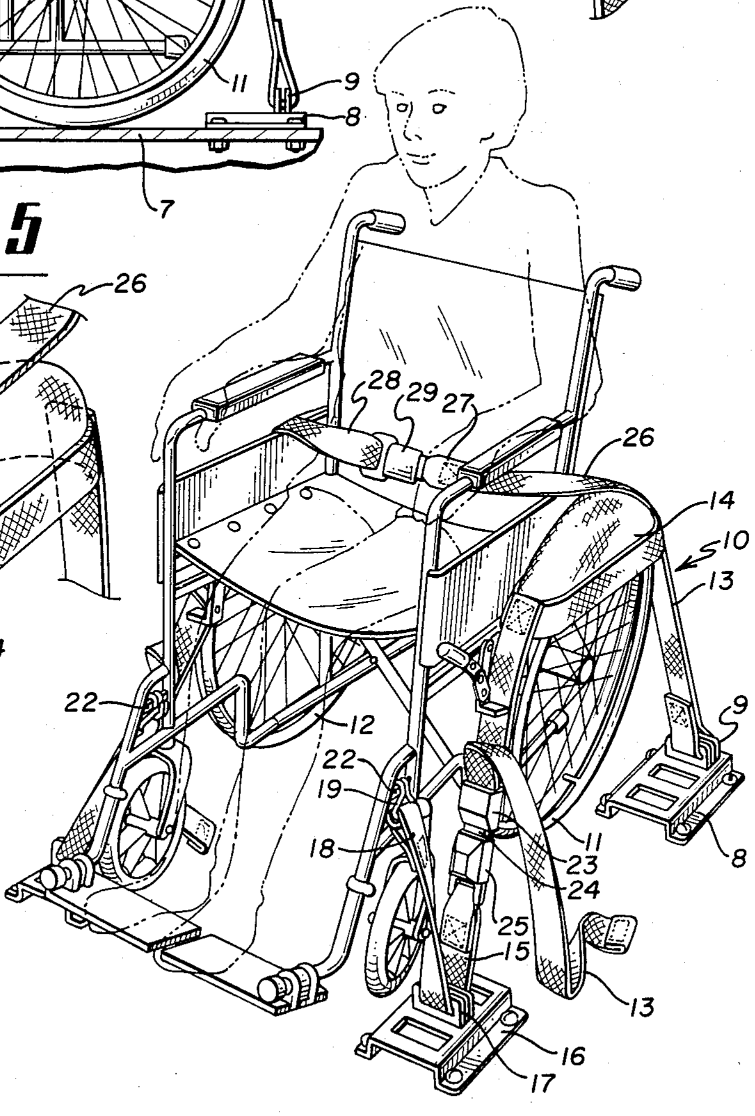
FIG. 2 is a front perspective view of the same.
Figure 5:
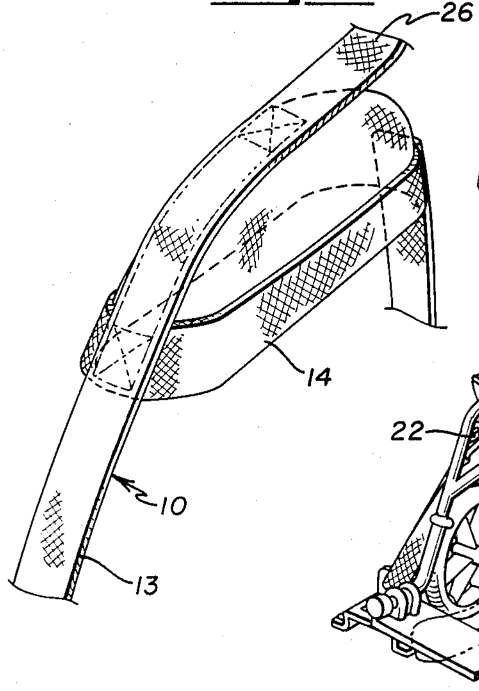
FIG. 5 is a perspective view on an enlarged scale of the hood member of one of our tensioning straps.

The tensioning device 10 includes an elongated strap 13 which has a hood member 14 incorporated within its intermediate portion and constructed and arranged to slip over the upper periphery of the wheel 11 or 12, as shown in FIGS. 1 and 2. The end portion 15 of the tensioning device 10 opposite that connected to the anchor 8 extends forwardly and downwardly from the hood member and passes through a keeper 16 which likewise is fixedly secured to the floor 7 and includes upstanding loops 17 through which end portion 15 extends. End portion 15 is free to slide through loops 17, as desired. The terminal portion 18 of the end portion 15 is secured to a hook member 19 and its associated locking ring 20.

Figure 3:
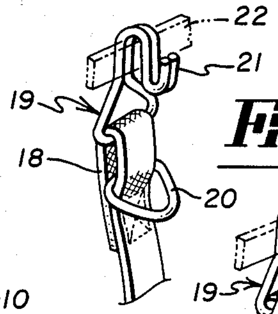
FIG. 3 is a perspective view of an enlarged scale of our hold-down hook in unlatched and non-tensioned position.
Figure 4:
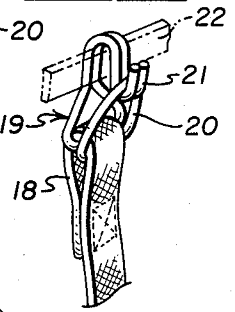
FIG. 4 is a perspective view on an enlarged scale of our hold-down hook in latched and tensioned position.

The hook member 19 has a free end portion which is reversed outwardly upon itself to form a keeper 21 which faces upwardly when the hook member 19 is applied to the frame 22 of the wheelchair, as shown in FIGS. 3 and 4.

The tensioning device 10 includes a releasable female buckle or connector member 23 which receives the tongue 24 of a male buckle member 25 in interlocking relation, by device of which the tensioning device may be released while under tension, when same is desired. This is a type of releasable connection such as is commonly utilized as part of automobile and aircraft safety belts. Tension may be readily applied to the tension device when buckle members 23 and 25 are interlocked and hook member 19 is secured to frame 22 by merely pulling upon the free end portion of strap 13, as illustrated in FIG. 2.

A section of a similar seat belt arrangement is utilized as part of each of our tensioning device 10. Thus, a strap 26 is secured as by sewing to strap 13 adjacent the rear end of hood 14 and terminates in a male buckle member 27 similar to buckle 25. A similar strap 28 is secured to the opposite tensioning device 10 at a similar location and terminates in a female buckle member 29. When joined, the two straps 26, 28 and their interlocking buckles 27, 29 positively secure the occupant of the wheelchair therewithin, as shown in FIG. 2.

In use, the wheelchair to be transported is moved into position, as shown by chair 6, in FIGS. 1 and 2, and hood member 14 of each tensioning devices is applied, as shown, to the upper periphery of its associated large wheel 11 or 12, as the case may be. Hook members 19 are then applied to frame 22 at the respective sides of the chair 6, as shown, and thereafter buckles 23 and 25 are interlocked, also as shown in FIGS. 1 and 2. Buckles 27 and 29 are then interlocked and the assembly is now ready for tensioning of the tension device.

Tensioning of each of the two tensioning devices 10 is then accomplished by merely pulling upon the free end portion of straps 13, shown in FIG. 2. Such tightening pulls downwardly upon the upper periphery of each of the large wheels 11, 12 and holds the same against forward or rearward movement. Hood members 14 positively preclude shifting of the chair 6 axially of the wheels 11, 12, as do the terminal portions 18 and hook members 19 which, it will be noted, extend inwardly toward each other to the frame 22 of the chair. Hook members 19 also positively preclude upward and rearward rotation of chair 6 about the axis of its wheels 11, 12.

Further tightening of tension device 10 results in increased downward pull upon frame 22 and hood members 14 thus more firmly securing the chair 6 to the floor and the occupant within the chair.

It will be noted that ring 20 is applied to keeper 21 while tensioning device 10 is not under tension. Since the vertical dimensions of ring 20 are less than those of hook 19 from its point of attachment to terminal portion 18 and its free end portion (keeper 21), ring 20 effectively locks frame 22 within hook 19 immediately upon tensioning of tensioning means 10.

In considering this invention, it should be remembered that the present disclosure is illustrative only and the scope of the invention should be determined by the appended claims.

We claim:

1. Wheelchair transport apparatus comprising:

(a) a vehicle having a floor;

(b) a pair of separate elongated flexible tensioning means each having intermediate portions constructed and arranged to engage and extend along the upper periphery of one of the large wheels of the wheelchair to be transported and to prevent axial slippage with respect thereto;

(c) a pair of anchor means carried by said floor and securing one end portion of each of said tensioning means to said floor at points spaced from each other a distance approximating the axial spacing of the large wheels of the wheelchair chair to be transported;

(d) a pair of keeper means secured to said floor, each in aligned spaced relation with one of said anchor means and spaced therefrom a distance somewhat greater than the diameter of the large wheel of the wheelchair to be transported and secured thereby;

(e) each of said elongated flexible tensioning means extending through its aligned keeper means in free-sliding, piercing relation; and (f) connector means carried by the terminal portion of the opposite end portion of said tensioning means for connecting said terminal portion under tension to the frame of such a wheelchair to be transported to preclude rotation of the chair relative to the axis of its large wheel while the latter is being transported.

2. The structure defined in claim 1, wherein each of said tensioning means includes a hood member carried by its intermediate portions, said hood member being constructed and arranged to receive therewithin the upper peripheral portions of such a large wheel to positively engage and secure the same when so applied and said tensioning means is tensioned.

3. The structure defined in claim 1 wherein each of said tensioning means includes a concave member carried by its intermediate portions, said concave member being constructed and arranged to receive within its concavity the upper peripheral portions of one of the large wheels of the wheelchair to be transported to positively engage and secure the same when so applied and said tension means is tensioned.

4. The structure defined in claim 1, and (g) cooperative restraint belt means connected to the intermediate portions of each of said tensioning means and extending therebetween to cooperatively secure an occupant in such a chair to be transported.

5. The structure defined in claim 1 wherein said connector means is comprised of a hook member mounted upon the terminal portion of said opposite end portion of each of said tensioning means, each of said hook members having a free end portion reversed outwardly upon itself to form a keeper, and a ring connected to said terminal portion adjacent said hook member and receivable within its said keeper to positively secure said terminal portion to the frame of a wheelchair when a portion of that frame is received within and between said hook member and said ring.

6. A device for securing a wheelchair to the frame of a transporting vehicle comprising, (a) an elongated tensioning means constructed and arranged to permit tensioning of the intermediate portions thereof;

(b) means for securing one end portion of said tensioning means to such a frame to create a downwardly force upon the upper periphery of the large wheel of such a wheelchair;

(c) said tensioning means being constructed and arranged at its imtermediate portions to prevent axial slippage relative to such a large wheel of a wheelchair when tensioned over and along the upper periphery thereof;

(d) means for connecting the opposite end portion of said tensioning means under tensioned condition to such a frame at a level lower than the upper periphery of the large wheel and in a plane normal to its axis and extending through the wheel and the point of securement to the frame of said first-mentioned means; and (e) means carried by said opposite end portion for connecting its terminal portion under tension to the frame of such a wheelchair to preclude rotation of the chair relative to the axis of its wheel, when the latter is so secured.

7. The structure defined in claim 6 wherein said tensioning means includes a hood member carried by its intermediate portions, said hood member being constructed and arranged to receive therewithin the upper peripheral portions of such a wheel to positively engage and secure the same when said tensioning means is tensioned.

8. The structure defined in claim 6 wherein said means carried by said opposite end portion is comprised of a keeper through which said elongated tensioning means extends in piercing relation for free relative movement therethrough.

9. The structure defined in claim 6, wherein said means for connecting the opposite end portion of said tensioning means to such a frame at a level lower than the upper periphery of the large wheel, is constructed and arranged to permit said tensioning means to freely shift longitudinally relative to its point of said connection to the frame of the vehicle.

10. A device for securing a wheelchair to the floor of a transporting vehicle comprising:

(a) an elongated flexible tensioning means constructed and arranged to tension the intermediate portions thereof;

(b) means for securing one end portion of said tensioning means to the floor of such a vehicle;

(c) means carried by the intermediate portions of said tensioning means for engaging and creating a downward force upon the upper periphery of a large wheel of such a wheelchair and constructed and arranged to prevent axial slippage thereof relative to the wheel when the intermediate portions of said tensioning means is tensioned over and along the upper periphery thereof;

(d) means for connecting the opposite end portion of said tensioning means to the floor of such a vehicle under tensioned condition at the opposite side of the axis of the wheel relative to said securing means, and (e) connector means carried by said opposite end portion for connecting its terminal portion under tension to the frame of such a wheelchair to thereby preclude rotation of the chair relative to the axis of its wheel when the latter is so secured.

11. The structure defined in claim 10 wherein said tensioning means includes a concave member carried by its intermediate portions, said concave member being constructed and arranged to receive within its concavity the upper peripheral portions of such a wheel to positively engage and secure the same when said tensioning means is tensioned.

12. The structure defined in claim 10 wherein said tensioning means includes a downwardly facing hood member carried by its intermediate portions, said hood member being constructed and arranged to receive therewithin the upper peripheral portions of such a wheel to positively engage and secure the same when said tensioning means is tensioned.

13. The structure defined in claim 10 wherein said means carried by said opposite end portion is comprised of a keeper through which said elongated tensioning means extends in piercing relation for free relative movement therethrough.

14. The structure defined in claim 10 wherein said connector means is comprised of a hook member mounted upon said terminal portion and having a free end portion reversed outwardly upon itself to for a keeper, and a ring connected to said terminal portion and receivable within said keeper to positively secure said terminal portion to the frame of a wheelchair.

15. The structure defined in claim 10, and (f) cooperative restraint belt means for a wheelchair occupant carried by said intermediate portions of said tensioning means and being constructed and arranged to cooperatively interlock with a corresponding cooperative restraint belt means carried by a similar wheelchair securing device applied to the opposite side of the wheelchair.

16. A method of securing to a floor of a transporting vehicle a wheelchair frame having at opposite sides thereof a pair of axially spaced relatively large wheels mounted thereon for rotation about a common axis about which its chair is free to rotate, consisting in:

(a) providing a pair of separate elongated flexible tensioning means;

(b) securing one end portion of each of said tensioning means to the floor of the vehicle at a distance apart approximately equal to the axial spacing of the wheels of the wheelchair;

(c) extending each of said tensioning means from the rear of the wheelchair upwardly over and along the upper periphery of one of the wheels thereof in positive engaging relation to preclude movement of the wheel relative thereto;

(d) slidably extending each of said tensioning means from the upper periphery of its associated wheel through keeper means secured to the floor ahead of each of the wheels of the wheelchair;

(e) extending the opposite end portion of each of said tensioning means from its associated keeper means to the frame of the wheelchair and securing the same thereto ahead of the axis of its large wheels; and (f) tensioning each of said tensioning means to thereby effectively draw the same tightly down upon the upper periphery of its associated large wheel to secure the same and to urge the forward end of the wheelchair downwardly toward the floor to thereby prevent rearward tipping of the wheelchair about the axis about which the large wheels are mounted.

* * * * *